(12) United States Patent
Pan

(10) Patent No.: US 11,888,842 B1
(45) Date of Patent: Jan. 30, 2024

(54) SYSTEM AND METHOD FOR COMMUNICATION MANAGEMENT VIA COGNITIVE TESTING

(71) Applicant: United Services Automobile Association (USAA), San Antonio, TX (US)

(72) Inventor: Wei Pan, Plano, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 165 days.

(21) Appl. No.: 17/219,397

(22) Filed: Mar. 31, 2021

Related U.S. Application Data

(60) Provisional application No. 63/129,055, filed on Dec. 22, 2020.

(51) Int. Cl.
*H04L 29/06* (2006.01)
*H04L 9/40* (2022.01)
*G06F 21/36* (2013.01)

(52) U.S. Cl.
CPC ............ *H04L 63/083* (2013.01); *G06F 21/36* (2013.01); *H04L 63/0861* (2013.01)

(58) Field of Classification Search
CPC .... H04L 63/083; H04L 63/0861; G06F 21/36
USPC .......................................................... 726/7
See application file for complete search history.

(56) References Cited

U.S. PATENT DOCUMENTS

| | | | | |
|---|---|---|---|---|
| 2014/0189856 A1* | 7/2014 | Yoo | ......................... | G06F 21/36 726/19 |
| 2014/0196119 A1* | 7/2014 | Hill | ........................ | G06F 21/30 726/4 |
| 2014/0344954 A1* | 11/2014 | Kim | ...................... | H04L 63/105 726/28 |
| 2016/0294837 A1* | 10/2016 | Turgeman | ............. | G06F 21/316 |
| 2017/0154177 A1* | 6/2017 | Tsou | ....................... | G06V 40/18 |

OTHER PUBLICATIONS

Combinatorial Optimization of Graphical User Interface Designs, Oulasvirta et al., Feb. 2020 (Year: 2020).*

* cited by examiner

*Primary Examiner* — Jahangir Kabir
(74) *Attorney, Agent, or Firm* — Fletcher Yoder P.C.

(57) ABSTRACT

A communication management system provides a cognition test electronically to control access to an account. A test implementer includes a graphical user interface. One or more processors are configured to administer the cognition test by: displaying a plurality of image components on the graphical user interface such that each image component of the plurality of image components moves along a respective movement path within the graphical user interface; receiving an input via the graphical user interface; comparing the input to a solution value for the cognition test, wherein the solution value is based on the plurality of image components; blocking access to a protected account based on the input not correlating to the solution value; and allowing access to the protected account based on the input correlating to the solution value.

21 Claims, 4 Drawing Sheets of the present disclosure;

SYSTEM AND METHOD FOR COMMUNICATION MANAGEMENT VIA COGNITIVE TESTING

CROSS-REFERENCE TO RELATED APPLICATIONS

The present application claims priority to and the benefit of U.S. Provisional Application No. 63/129,055, entitled "SYSTEM AND METHOD FOR COMMUNICATION MANAGEMENT VIA COGNITIVE TESTING" and filed on Dec. 22, 2020, the disclosure of which is incorporated by reference herein for all purposes.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Computing devices, such as portable electronic devices (e.g., smartphones), are frequently used to conduct transactions, access sensitive data, communicate private information, and the like. As the use of computing devices for such tasks becomes more prevalent in modern society, there is a need for more complex and use-specific security systems to protect communications and personal information. While many traditional security protocols can prevent unauthorized access to sensitive data, there need to be more options for protecting sensitive data based on dynamic circumstances.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In accordance with an embodiment, a communication management system provides a cognition test electronically to control access to an account. A test implementer includes a graphical user interface. One or more processors are configured to administer the cognition test by: displaying a plurality of image components on the graphical user interface such that each image component of the plurality of image components moves along a respective movement path within the graphical user interface; receiving an input via the graphical user interface; comparing the input to a solution value for the cognition test, wherein the solution value is based on the plurality of image components; blocking access to a protected account based on the input not correlating to the solution value; and allowing access to the protected account based on the input correlating to the solution value.

In an embodiment, a communication management system is configured to provide a cognition test. A test implementer includes a graphical user interface and a biometric detector. One or more processors are configured to administer the cognition test by: displaying a plurality of image components on the graphical user interface such that each image component of the plurality of image components moves along a respective movement path at one of various speeds within the graphical user interface; receiving an input via the graphical user interface; comparing the input to a solution value for the cognition test; blocking access to a protected account based on the input not correlating to the solution value; blocking access to the protected account based on the input being received without being in conjunction with identification of an authorized biometric input by the biometric detector; and allowing access to the protected account based on the input correlating to the solution value.

In an embodiment, a method of providing a cognition test electronically to protect data is provided. The method includes: displaying a plurality of image components on a graphical user interface of a test implementer such that each image component of the plurality of image components moves along a respective movement path within the graphical user interface; receiving a first input via the graphical user interface; comparing the first input to a solution value for the cognition test; blocking access to a protected account based on the first input not correlating to the solution value; and allowing access to the protected account after blocking the access based on a second input correlating to the solution value.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
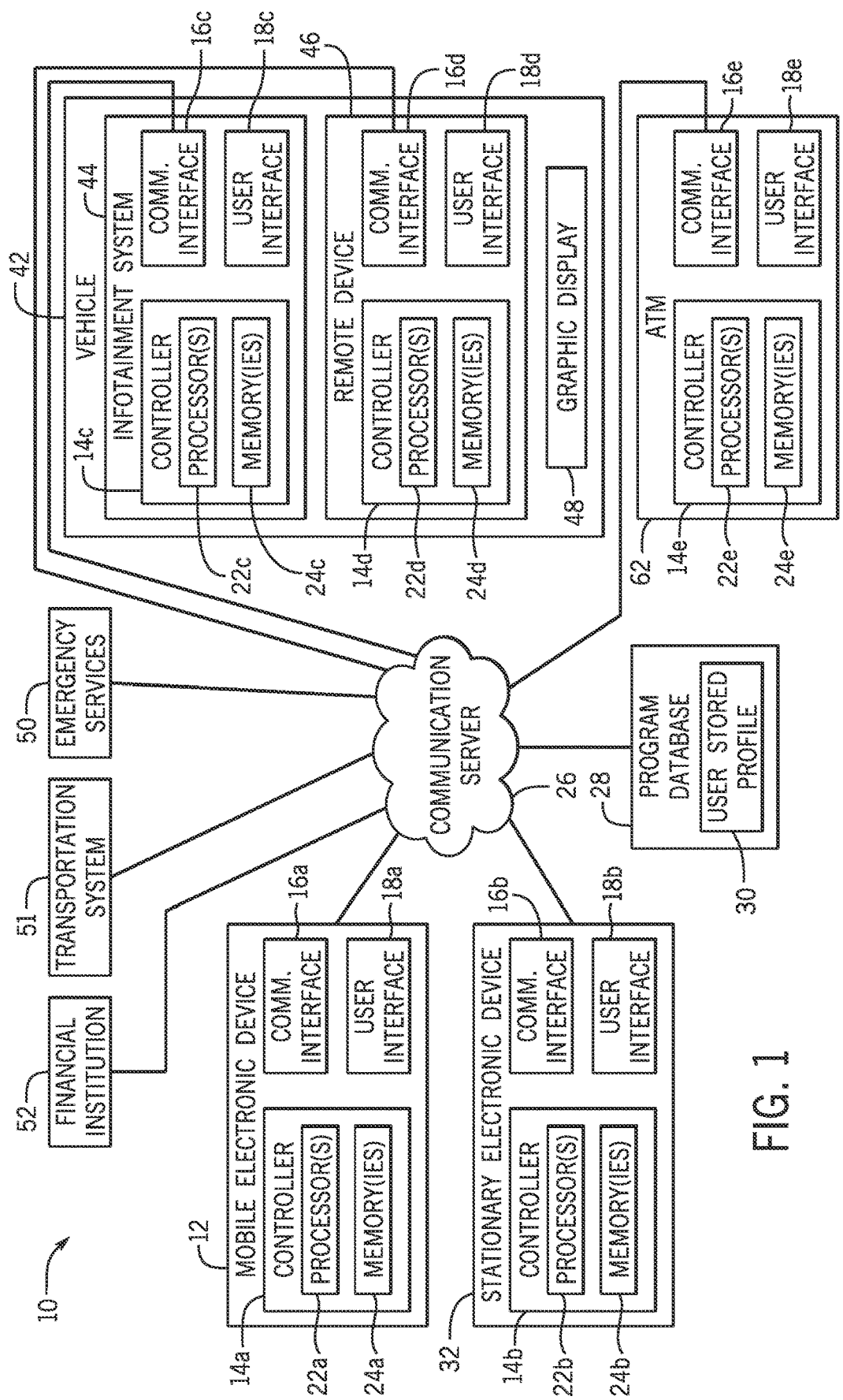
FIG. 1 is a schematic block diagram of a communication management system configured to control access via an electronically provided cognition test, in accordance with an embodiment of the present disclosure.

The present disclosure generally relates to a cognition test (or cognitive test), and more particularly to an electronically provided cognition test that inhibits a user in a disoriented state from performing actions on a computing device that may be regrettable. Because computing devices, such as portable electronic devices (e.g., smart phones), are so prevalent in society and because they are frequently used to access sensitive data (e.g., financial data, confidential communications, medical information), it is important that programs and applications used to access the sensitive data via such computing devices be protected from unauthorized users. Further, it is now recognized that, because users tend to keep these computing devices nearby at all times, access to the sensitive data is always readily available via the computing devices. This includes when the authorized user in in a cognitive state that may not be conducive to managing the sensitive data properly. Thus, it is now recognized that such ready access to sensitive data via computing devices can be a detriment to a user when the mental state of the user is such that access to certain information (e.g., via a portable electronic device) should not be granted. Indeed, current security systems, while sufficient for their intended purposes of preventing unauthorized users from getting access, are often easily bypassed in situations involving access by the approved user when the approved user is in a problematic mental state (e.g., inebriated or otherwise lacking cognitive function). For example, despite being in a disoriented mental state, an authorized user can often still remember a password or the like. Thus, it is now recognized that there is a need for a security system that is complex enough to prevent an authorized user from performing regrettable actions when the authorized user in certain disoriented states.

One or more specific embodiments are described herein. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As computers have increased in popularity over the last several decades, use of computers to manage accounts including sensitive data has become ubiquitous. To prevent unauthorized access to such accounts and related sensitive data, user authentication systems are typically employed by relevant software and hardware applications. For example, in order to access an account (e.g., to review or utilize sensitive data), an application (e.g., a software or hardware based program) typically requires a password or some other type of authentication before allowing access. For example, an authentication process often includes a requirement to provide one or more character-based passcodes, numerical PINs (personal identification numbers), biometric input, or the like to gain access to a protected account. As used herein, a protected account may include a financial account, communication account (e.g., email account), a software application, a device, a database, a control system, or any other tool, application, program, dataset, system or the like to which access is limited by an authentication process or system.

Authentication processes and systems, such as those discussed above, are typically utilized for guarding against access to protected accounts by unauthorized users (e.g., hackers). However, it is now recognized that even an authorized user may prefer to be excluded from certain accounts (e.g., a financial account) if the authorized user is not in a proper mental state to access the account. For example, a user may prefer to be blocked from accessing funds (e.g., for a withdrawal or purchase) in their own account when the user is in a disorientated cognitive state (e.g., confused, inebriated, sleep deprived). Because traditional security systems can be bypassed when an electronic device user is an authorized user (e.g., via use of facial recognition as an electronic passkey), the authorized user is at risk of performing a regrettable action when he or she accesses a protected account while in a disoriented mental state. For example, the authorized user may use poor judgement in making a large purchase or a large withdrawal because the authorized user is not in a right frame of mind due to being in a disoriented cognitive state. Thus, present embodiments provide an additional layer of authorization or testing as a separate or integrated procedure relative to an authorization protocol. Specifically, present embodiments incorporate features that test cognition and inhibit access to users that are determined to be in a cognitive state that limits the user's ability to pass the cognition test.

A cognition test, in accordance with present embodiments, is an electronically administered test that may function as a secondary authorization or admittance along with an existing type of authorization system (e.g., authentication system). Alternatively, the cognition test may be integrated with a type of authorization system such that the cognition test and authorization are essentially the same task. As an example, when functioning separately and in conjunction with an existing authorization system, passing the cognition test may be required before or after the authorization system grants authorization. For example, a user may have to pass the cognition test before being allowed to enter a password or, after properly entering a password, the user may be required to pass the cognition test before being granted account access. In an integrated embodiment, the cognition test may incorporate the authorization system. For example, a passcode may be integrated into the cognition test such that passing the cognition tests involves entering or knowing the password. In some embodiments, the cognition test is completely separate from any separate authorization test. For example, some features may be set to require passing the cognition test but allow access without authentication.

A cognition test in accordance with present embodiments includes electronically presented dynamic image components that must be observed via display and analyzed by the user to provide input that is indicative of sufficient cognizance (on the part of the user) to be granted an authorization. An image component, as displayed by the cognition test, may include an image of an object (e.g., fruit, animal, pattern, and shape), number, letter, word, and so forth. Such an image component may be displayed along with other image components in a dynamic manner (e.g., moving within a display). For example, the cognition test may display dynamic image components (e.g., moving alphanumeric characters) that all belong to a sequence (e.g., an ordered series of numbers or letters) in a changing display. The sequence, which may include a recognizable pattern among image components, is employed along with dynamic aspects of the display to challenge a user's ability to identify some aspect or anomaly among the image components. This may include selection of image components via touchscreen or some other interface (e.g., using a camera to position a user's image within the display in a manner that facilitates selection of the image components).

In one embodiment, for example, a sequence of numbers displayed by as part of the cognition test may include even numbers from 2 to 10, except for number 8; and a user attempting to pass the cognition test may be required to identify what number is missing (e.g., number 8) from the image components as the image components are moved about a display. In other embodiments, different types of answers may be required. For example, in an embodiment that combines a passcode authorization and the cognition test, a user may be required to select (e.g., via a touch screen) a passcode (e.g., a PIN) from various image components that are moving about. As another example, a user may be required to select an image component that does not fit together with other presented image components to define a complete picture. Methods of selection may include typing in an answer, touching the moving image components to provide the answer, selecting from multiple choice answers, manipulating an image of a user's face (e.g., moving or changing expressions) in coordination with moving image components on the same display, combinations thereof, and the like.

The user may be provided a limited amount of time to enter the proper answer. Various different types of movement may be employed with respect to moving the image components about the display. Further, movement patterns or paths may change with attempts or as time progresses within a timeframe for providing an answer. As a specific example, image components may be generally arranged in a circular configuration and move at varying rates generally along lines (e.g., radii) extending from a middle area of the circle to a periphery such that movements of the image components cumulatively suggest an expanding and contracting of circumferential portions of the circular configuration. The image components may move horizontally, vertically, and/or diagonally along a path extending from a center region of a circle to a perimeter area of the same circle. The different image components may move at different speeds, but some may travel with the same directionality. In other embodiments, different movement paths along with same or differing speeds may be employed to increase or decrease complexity and difficulty.

In one embodiment, the cognition test prompts the user to determine which dynamic image component is not seen in the sequence. For example, if the dynamic image components are numbers 1-5, and the number 4 is missing, the user should select the number 4. In another example, if a user's passcode is 512698, each of the digits is this passcode may be presented as an image component except for one and the user may be asked to identify the missing digit. Similarly, a digit in addition to those of the passcode may be displayed and the user may be asked to identify the digit that is not in the passcode. In yet another embodiment various numbers may be provided and a passcode may need to be selected from the moving numbers. While the previous examples refer to the use of numbers or digits, other images (e.g., text, symbols, graphics) may be used. In some embodiments, a user's face or fingerprint must be detectable (e.g., via a biometric detector) during the cognition test and associated selection process to confirm that an authorized user is performing the action. In other embodiments, the image components for selection may correspond in some fashion to various types of authentication codes so that the cognition test incorporates authentication by passcode (e.g., PIN, password).

The cognition test may be configurable for various user preferences. For example, in one embodiment, the user can input a known combination of image components (e.g., alphanumeric characters, images, emoji). From there, tests will be generated from the user's input. However, the user will determine which image component is not included in the original known combination. This embodiment essentially establishes a passcode and can serve as an authentication (e.g., a parental control on certain applications or websites).

With the foregoing in mind, turning now to the figures, FIG. 1 illustrates a block diagram of a communication management system 10 configured to control access via an electronically administered cognition test, according to an embodiment of the present disclosure. As shown in the example of FIG. 1, a communication management system 10 includes a mobile electronic device 12. The mobile electronic device 12 (which may be representative of any of various test implementers) includes various components that may assist the mobile electronic device 12 in performing various types of computing tasks and operations. Examples of such components of the mobile electronic device 12 are illustrated in FIG. 1 and include a controller 14a, a communication interface 16a, and a user interface 18a. While multiple different test implementers, such as the mobile electronic device 12, are illustrated in FIG. 1 and described below, present embodiments may include only one test implementer.

The controller 14 includes one or more processors 22a and memory 24a. The one or more processors 22a may be any type of computer processor or microprocessor capable of executing computer-executable code, such as instructions stored in the memory 24a. The processor 18a may also include multiple processors that may perform operations in accordance with the present disclosure, such as providing a cognition test. The memory 24a may be any suitable articles of manufacture that can serve as media to store processor-executable code, data, or the like. These articles of manufacture may represent non-transitory (tangible and not a signal), computer-readable media (e.g., any suitable form of memory or storage) that may store the processor-executable code and/or one or more applications used by the processor 22a to perform the presently disclosed techniques. As used herein, an application may include any suitable computer software or program that may be installed onto the mobile electronic device 12 (e.g., stored in the memory 24a) and executed by one or more processors 22a. A cognition test, which may be incorporated into an application, may be downloaded onto the mobile electronic device 12 and stored in the memory 24a. In this way, the cognition test may be accessible even when the mobile electronic device 12 (which is an example of a test implementer) is not able to communicate with other components of the communication management system 10. Indeed, the mobile electronic device 12, as with other such test implementers, may operate on its own as an embodiment of the communication management system 10.

The communication interface 16a may be configured to communicate with a communication server 26, which may be configured to communicate with various test implementers (mobile devices, computers). Thus, the communication interface 16a may facilitate communication between the mobile electronic device 12 (e.g., specifically the controller 14a of the mobile electronic device 12) and the communication server 26 via a network such as the Internet, or the like. Specifically, the communication server 26 may communicate with a program database 28 of the communication server 26 to access a user profile 30 (e.g., a profile configured by a user or based on user data) for use by the controller 14a. In addition to the user profile 30, the program database 28 may house other user information, such as historical usage data, preferences, testing parameters and so forth. For example, using any of various test implementers (e.g., the mobile electronic device 12) or other interfaces, a user may configure test parameters based on the user's preferences that may be stored as part of the user profile 30 or elsewhere in the program database 28. These parameters include, but are not limited to, timeframe allowed for completion of a cognitive test, number of chances given to successfully complete the cognitive test, entry mechanism for interfacing with the cognitive test, and choice of image components for displaying the cognitive test. If a user decides to modify any of the cognition test's parameters, such as a time frame allowed for completion of the test, by replacing a parameter with a new parameter, the new parameter may be saved within the memory 24a of the mobile electronic device 12, or stored in the user profile 30. Such interactions may be facilitated by the communication interface 16a linking the communication server 26 and the mobile electronic device 12. Further, once the parameters are chosen, the user may be prompted to participate in a calibration procedure that utilizes the selected parameters. If the calibration procedure is successful, the user may be provided with an option to save the parameters (e.g., to a test implementer's memory and/or the program database 28). If the calibration procedure is unsuccessful (e.g., the provided test is overly difficult for the user even in a proper mental state), the user may be prompted to reconfigure the parameters for a more appropriate calibration. This process may continue until functional parameters are configured.

The configurable and variable nature of present embodiments, as partially discussed above, provides the communication management system 10 with an advantage over having fixed parameters. For example, in addition to implementing user preferred variations, present embodiments may also obtain or generate different variations to provide variety and to adjust for a user's ability to overcome the intent of the test with practice and repetitive use. For example, if the test implementer is connected to the Internet, tests may be acquired from other sources to increase variability. These tests may be selected based on falling within the parameters identified and/or calibrated by the user and then the tests may be uploaded from various locations (e.g., the communication server 26) and saved into the test implementer's memory (e.g., memory 24a). For example, a first test and a second test may have the same time limit, number of chances, and image components but a different pattern of movement and/or sequence of image components. If the test implementer (e.g., mobile device 12) in use is not connected to the Internet, the test implementer may recall tests from the test implementer's memory to provide variability. Once the test implementer is reconnected to the Internet, the program database may save new tests into the test implementer's memory to provide variability when not able to access replacement tests on-line for variability.

The user interface 18 may take different forms depending on the type of test implementer being used. For example, a background application on the mobile electronic device 12 may operate to provide the cognitive test, a web browser add-on on a stationary electronic device (e.g. a desktop computer) may operate to provide the cognitive test, and so forth. The user may be prompted to choose the programs and/or applications to which the communication management system 10 controls access via the cognitive test. For example, on the mobile electronic device 12 (e.g., a smart phone), the user may elect to secure online banking applications, text messaging (e.g., text messaging to specific contacts), social media applications, and the like using the communication management system 10. In another example, a user may choose certain websites, an email program, or the like to be secured by the communication management system 10 and the cognitive test it provides.

The user interface 18a may depict visualizations associated with software or executable code being processed by the one or more processors 22a. The user interface 18a may be a touch display capable of receiving inputs from a user of the mobile electronic device 12. The user interface 18a may be any suitable type of display, such as a liquid crystal display (LCD), plasma display, or an organic light emitting diode (OLED) display, for example. Additionally, the user interface 18a may be provided in conjunction with a touch-sensitive mechanism (e.g., a touch screen) that may function as part of a control interface for the mobile electronic device 12. The user interface 18a may depict the cognition test. In one embodiment, the cognition test may comprise image components generally arranged in a circular configuration and moving at varying rates generally along lines (e.g., radii) extending from a middle area of the circle to a periphery such that movements of the image components cumulatively suggest an expanding and contracting of circumferential portions of the circular configuration. The image components may move horizontally, vertically, and/or diagonally along a path extending from a center region of a circle to a perimeter area of the same circle. The different image components may move at different speeds, same speeds and with different or same directionalities.

In one embodiment, the cognition test prompts the user to determine which dynamic image component is not seen in a provided sequence. In another embodiment, the user can input a known combination of image components that are not necessarily in sequence. Based on the provided combination, a cognitive test can be generated from the user's input. Examples of interactions for completing a cognitive test may include identifying an image component that should be present, should not be present (e.g., does not fit within a theme), selecting multiple image components in a designated order, selecting multiple like image components, selecting multiple different image components, and so forth.

As noted above, the mobile electronic device 12 is one example of a test implementer that provides the cognition test. In another embodiment, the cognition test is run on a different kind of test implementer, including a stationary electronic device 32 (e.g., desktop computer). For example, the cognition test may run as a web browser add-on of the stationary electronic device 32. The stationary electronic device 32 may comprise a controller 14b, wherein the controller comprises one or more processors 22b and memory 24b. The controller 14b may store browser history and a list of websites that the test may secure. For example, the memory 24b may store the web address for an online banking portal that the user chooses to secure. Further, the stationary electronic device 32 may include a communication interface 16b and a user interface 18b. The communication interface 16b may operate to facilitate communication between the stationary electronic device 32 and other features, much like the communication interface 16a. The user interface 18b may include any suitable type of display, such as a liquid crystal display (LCD), plasma display, or an organic light emitting diode (OLED) display, for example. Additionally, the user interface 18b may be provided in conjunction with a touch-sensitive mechanism (e.g., a touch screen) that may function as part of a control interface for the stationary electronic device 32. The user interface 18b may depict the cognition test, wherein the cognition test should be considered to have the same function as presented above. The user interface 18b may also present information not present in other embodiments (e.g., widgets, desktop icons).

In one embodiment, the cognition test will run in a vehicle 42, which includes the communication management system 10. Because the vehicle includes various different inputs, these inputs (e.g., steering wheel, brake pedal) may be employed by the communication management system 10 to interface therewith. The communication management system 10 in such an embodiment could be part of the vehicle's software via an infotainment system 44 and/or a remote device 46 (e.g., a smart phone or laptop computer) disposed within or tethered to the vehicle 42. The vehicle 42 may comprise a controller 14c wherein the controller comprises one or more processors 22c and memory 24c. The controller 14c may be able to store a user's combinations of inputs necessary to access the vehicle's capabilities that may be limited by the cognition test. For example, the memory 24c may store a plurality of steering wheel movement patterns and pedal inputs as a type of password such that, when corresponding inputs are detected, access to the vehicle's full functionality is provided. A communication interface 16c of the vehicle 42 (e.g., part of the infotainment system 44 and/or remote device 46) may facilitate communication between the vehicle 42 and the communication server 26, which may provide for customization of remotely stored preferences (e.g., the user-stored profile 30), for example. Further, the vehicle 42 may include a user interface 18c including any suitable type of display, such as a liquid crystal display (LCD), plasma display, or an organic light emitting diode (OLED) display, for example. Additionally, the user interface 18c may be provided in conjunction with a touch-sensitive mechanism (e.g., a touch screen) that may function as part of a control interface for the vehicle 42. The user interface 18c may depict the cognition test, wherein the cognition test should be considered to have the same function as presented above. The user interface 18c may also present information not present in other embodiments (e.g., radio stations, temperature settings).

Relative to previously described embodiments, the infotainment system 44 and/or remote device 46 may facilitate a different input method for the cognition test via linkage to the vehicle 42. For example, referring now to FIG. 5, components of the vehicle 44, such as a steering wheel 402, an accelerator pedal 404, and/or a brake pedal 406, may be employed by the communication management system 10 as input mechanisms. The image components may be displayed on the graphic display 48 of the vehicle's infotainment system 44 and/or the remote device 46 an selection of the image components (e.g., image components 310) may be made by actuation of the components of the vehicle 44. As a specific example, the cognition test may prompt a user to turn the steering wheel 402 to position a cursor over a correct answer and apply pressure to the accelerator pedal 404 or the brake pedal 406 to select that answer. If the user cannot complete this test, then it may indicate that the user should not operate the vehicle 42. Another addition to this embodiment is communication with emergency services 50. If the user fails the test too many times, the communication management system 10 may limit functionality of the vehicle 42 and communication may be established between the communication interface 16c and the communication server 26 to obtain assistance. This may include the communication server 26 establishing a connection with transportation 51 or emergency service 50 options.

While the components of the vehicle 44, including the steering wheel 402, the accelerator pedal 404, and/or the brake pedal 406, were provided as example inputs above. It should be noted that they are representative of any of various inputs available via the infotainment system 44 or the vehicle 42 in general. For example, a radio tuner, volume knob, radio button, horn, shifter, or any other input in the vehicle 44 may be employed as input mechanism by present embodiments.

In an embodiment of the present disclosure, the communication management system 10 is incorporated or functions with an automatic teller machine (ATM) 62. The ATM 62 may be programmed to prompt a user to take a cognition test after credit and/or debit card insertion. These instructions may be stored in a memory 24e and carried out by one or more processors 22e wherein both components are within a controller 14e. The ATM 62 may communicate with the program database 28, via the communication server 26, to recall the user's profile 30. The functions of the controller 14e may include but should not be limited to functions described above relative to other embodiments. Specifically, the ATM 62 may not store user information in the memory 24e. Further, the communication interface 16e may function similarly to the disclosed function above. However, the user interface 18e may differ from the previously disclosed embodiments above. The user interface 18e may be any suitable type of display, such as a liquid crystal display (LCD), plasma display, or an organic light emitting diode (OLED) display, for example. Additionally, the user interface 18e may be provided in conjunction with a touch-sensitive mechanism (e.g., a touch screen) that may function as part of a control interface for the ATM 62. If the user fails the test too many times, it may result in a temporary ban on the card wherein the indication of a ban will be communicated through the communication interface 16e to the communication server 26 and then to the financial institution 52. As part of a calibration or configuration process, the user may choose the duration of the ban from a mobile electronic device 12 or a stationary electronic device 32 where it will then be stored in the user stored profile 30 within the program database 28. Because this is a cognition test and not necessarily an authentication, the limited ban may automatically be removed without requiring contact with customer support based on a user's configuration. However, in some embodiments, contact with customer support may be required to reinstate access to a credit card, debit card, or the like.

Figure 2:
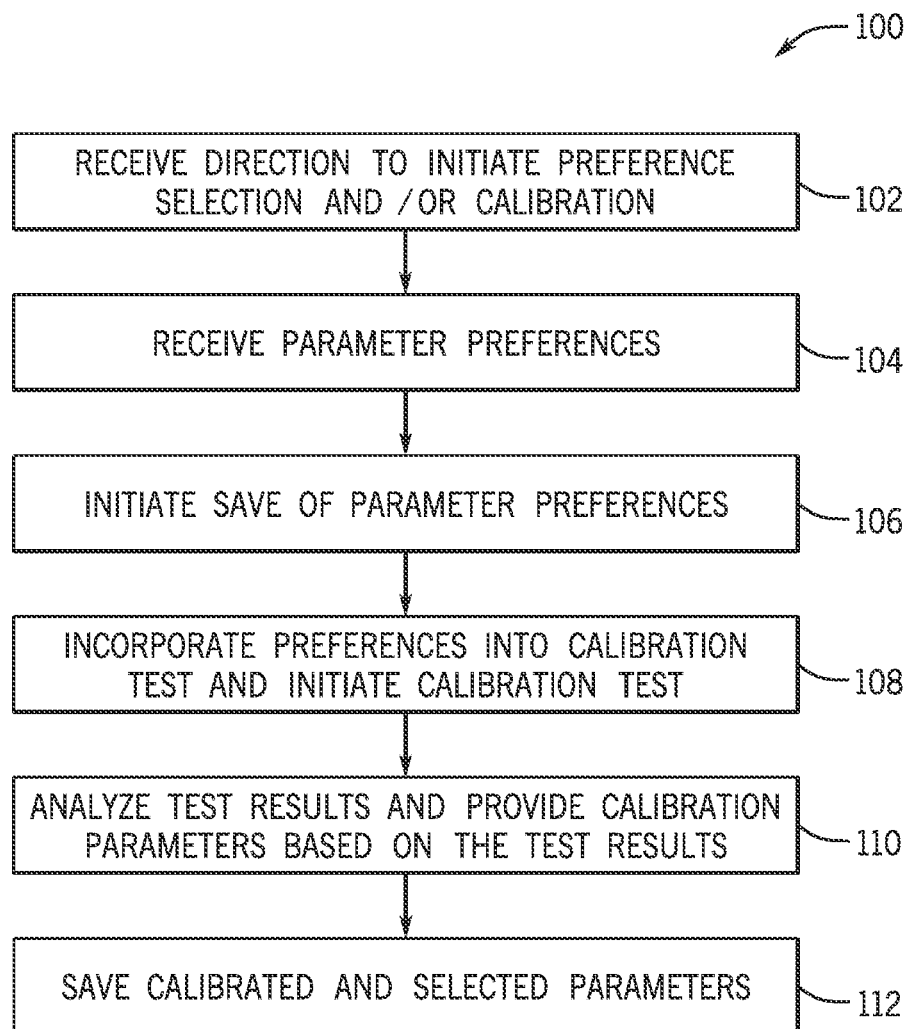
FIG. 2 is a flow chart for calibrating the cognition test provided by the communication management system based on user-selected parameters, in accordance with an embodiment of the present disclosure.

FIG. 2 is a flow diagram of an embodiment of a process 100 for calibrating the cognition test based on user-selected parameters. The calibration may be performed on any of the test implementers disclosed above, such as the mobile electronic device 12, the stationary electronic device 32, the vehicle 42, and/or the ATM 62. Specifically, the process 100 may be executed by the controller on any of the test implementers (e.g., 14a, 14b). Different calibrations may be appropriate for each type of test implementer because performance may vary based on physical limitations. For example, for certain users, interacting with a display of a mobile electronic device 12, such as a smart phone, may be easier that interfacing with the infotainment system 44 of the vehicle 42. Thus, different calibration parameters may be needed for each.

In the illustrated embodiment, the process 100 begins with the communication management system 10 (e.g., an application on the mobile electronic device 12) receiving an indication to initiate a preference selection and/or calibration procedure, as indicated by block 102. This may include selection of a feature or opening of a guidance screen (e.g., a menu). In particular, the process may yield a dynamic graphic on a user interface of any of the test implementers (e.g., 18a, 18b) with guidance regarding proceeding with preference selections and/or calibration. For example, navigation to the dynamic graphic may effectively initiate the calibration and/or customization process 100.

As a customization aspect, the method may include prompting the user to select parameters (e.g., image components) for modification. Accordingly, block 104 represents a step of receiving (e.g., via an input device of the communication management system 10) parameters for modification. Specifically, the communication management system 10 may provide the user with options to choose image components that may include an image of an object (e.g., fruit, animal, pattern, or shape), number, letter, word, and so forth. The communication management system 10 may also provide the user with the option to choose the time interval in which correct input for the calibration test is needed. However, in some embodiments, this value may be defined by how quickly the user is able to perform certain tasks within a calibration operation. The communication management system 10 may also provide the user with an option to choose the number of attempts the user has to input the correct input. However, again, this may be established by a calibration procedure that determines how many errors the user commits while in a standard cognitive state (e.g., wide awake and sober). Once the user has identified their preferred combination of parameters, the user is prompted by the communication management system 10 to save those parameters, as indicated by block 106. After saving the user's preferred parameters, the user is navigated to a calibration test that incorporates the user's selected parameters into a calibration test to calibrate the communication management system 10, as indicated by block 108. In some embodiments, the calibration test does not necessarily incorporate any preferences to limit variance with respect to the calibration procedure.

The calibration test provided in block 108 may include various pattern recognition tests, dexterity tests, visual tests, and the like. In some embodiments, example cognition tests are provided. Each of these tests is monitored and timed for performance level to set a baseline for comparison and preparation of the cognition test. As previously noted, some users may have higher levels of performance than others regardless of their cognitive state. Accordingly, calibration is necessary to make sure that sufficient difficulty is provided during an actual cognition test. Test results are then analyzed in block 110 to establish calibrated parameters. Once parameters have been selected and/or calibrated, the parameters will be saved (e.g., in the user stored profile 30 in the program database 28), as indicated by block 112. The user may repeat blocks 104 through 108 as many times as necessary to find the appropriate parameters.

In another embodiment, the cognition test provided by the communication management system 10 may essentially be pre-calibrated. For example, the communication management system 10 may store numerous cognition tests with different image components and different difficulties. The difficulty level may be determined by time allowed for successful completion and the speed of the image components. For example, a calibration test with fast moving image components and a short time to complete the test, may be determined to be more difficult than a calibration test with slow moving image components and a long time to complete the test. These tests may be stored locally on any test implementers memory or may be downloaded from the program database 28 to be stored on a test implementer's memory. Having the calibration tests stored locally on a test implementer may reduce network traffic. The calibration test may have a time limit in which the user must input a correct input. If a user cannot pass a calibration test, the test implementer may recall a test with less difficulty from its memory. This may allow a user to find a difficulty of test that they find suitable during a calibration process. To some extent, less difficult tests may also be provided when an actual cognitive test is being implemented after an initial failure. However, based on calibration or preference settings, lower limits of difficulty may be set.

Figure 3:
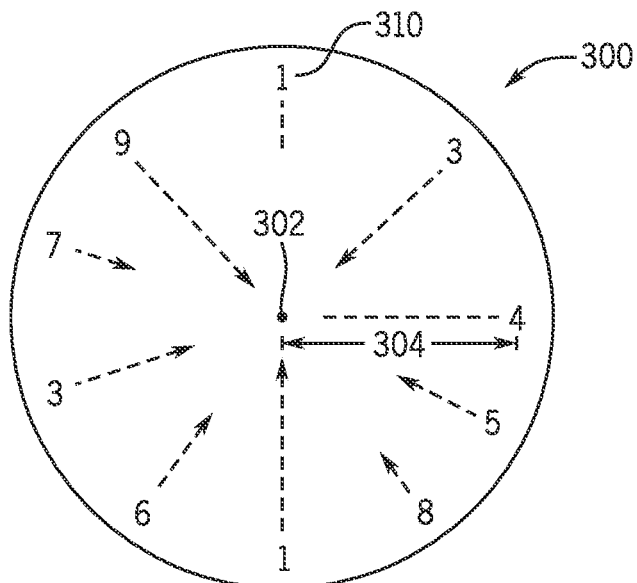
FIG. 3 is a schematic diagram of a graphical user interface (GUI) including a dynamic graphic presented on a display of the communication management system as part of the cognition test, wherein image components are transitioning along movement paths, in accordance with an embodiment of the present disclosure.

Test results and calibration results may be stored and made available to users for their own personal reference and/or for data mining. Such data may be employed to analyze behavior and develop better testing and calibration procedures. The communication management system 10 may also provide users with the option to receive usage updates as long as they are connected to the Internet. These usage updates may include which accesses were granted or denied, performance statistics (e.g., types of tests taken, attempts, successes, failures, time spent). The user may be provided with the option to receive these updates with whatever frequency they decide (e.g. daily, weekly, monthly). These updates may be stored in the test implementer's memory, as well as the program database FIG. 3 is a schematic diagram of a graphical user interface (GUI) or dynamic graphic 300 including a dynamic graphic presented on a display of the communication management system as part of the cognition test, wherein image components are transitioning along movement paths, in accordance with an embodiment of the present disclosure. FIG. 3 is essentially a snapshot in time of a dynamic graphic 300 (with image components 310 and indications of movement paths 312) that may be presented on the user interface of any of the test implementers. The dynamic graphic 300 may include a plurality of the image components 310. For example, the image components 310 may be numbers, as shown in FIG. 3. The image components 310 may be arranged in a generally circular configuration about a central point 302. The image components 310 may be disposed at a consistent distance or varying distances 304 (i.e. a radius) from the central point 302. The image components 310 may move along respective ones of the movements paths 312 at various speeds, wherein the speed of one image component does not need to be the same as another one. The different speeds may make the cognition test more complex and may require more concentration to achieve success. While the movement paths 312 are shown as substantially straight lines in the illustrated embodiment, it should be understood the movement paths 312 can represent any of various paths including additional or less complexity. Further, while the movement paths 312 indicate an inward motion in FIG. 3. This illustration represents at a point in time and may change (e.g., the image components may reverse along the movement path 312 or start on a completely different movement path 312).

Figure 4:
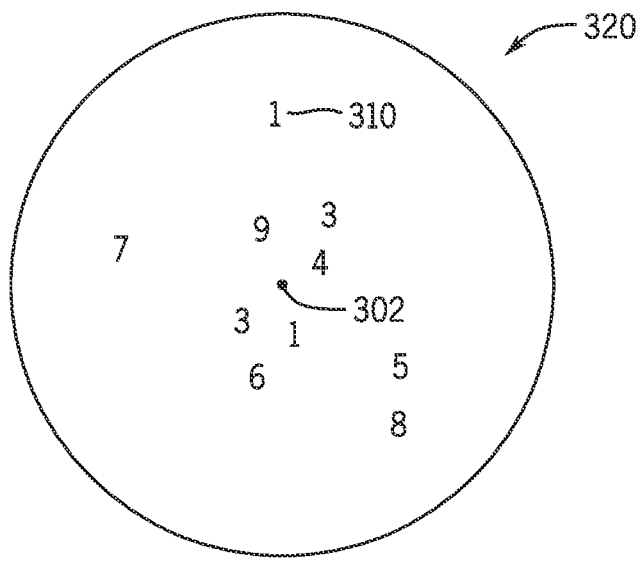
FIG. 4 is a schematic diagram of the GUI, wherein the image components have transitioned from initial positions toward a center of the GUI at varying speeds, in accordance with an embodiment of the present disclosure.

FIG. 4 is a schematic diagram of the GUI or dynamic graphic 300, wherein the image components 310 have transitioned from initial positions toward the central point 302 of the dynamic graphic 300 at varying speeds, in accordance with an embodiment of the present disclosure. In other words, FIG. 4 illustrates a snapshot of dynamic graphic 300 at a time subsequent to that illustrated in FIG. 3. In the snapshot provided by FIG. 4, the image components 310 are the same as presented in FIG. 3, but further inward along the movement paths 310. Further, each of the image components 310 is shown as having traversed a different distance along its respective movement path 312 to emphasize the different speeds of the image components 310. In the illustrated embodiment, the movement paths 310 may be such that the overall visual is a pulsing in and out as time elapses. This is believed to create a challenge for those in an impaired cognitive state. However, other movement patterns are also presently disclosed.

Along with the dynamic graphic 300 being presented as the user interface on any of the test implementers, the communication management system 10 may provide a prompt 316 for the user in the dynamic graphic 300 as a part of the cognitive test, such as a question relating to performance of the cognitive test. In an example embodiment, a question may be "Which image component is missing?", as illustrated in FIGS. 3 and 4. In order to pass the cognitive test, the user will need to select which image component is missing. For example, in the example embodiment of FIGS. 3 and 4, the image components are numbers. Further, the numbers are all single-digit, and the number 2 is missing from an otherwise complete sequence of numbers from 1 to 9. Thus, a successful user would select the number "2" from a multiple choice answer bank within an appropriate timeframe. The user may need to complete this test multiple times, wherein each test may have a different missing image component. Including multiple tests will ensure that a user's information is secure and cannot be accessed by an accidental selection of the correct answer. In other embodiments, tests of a different nature may be performed. For example, a user may be required to touch each moving number in a previously established password or in a changing or fixed series of numbers presented on the dynamic graphic 300.

Figure 5:
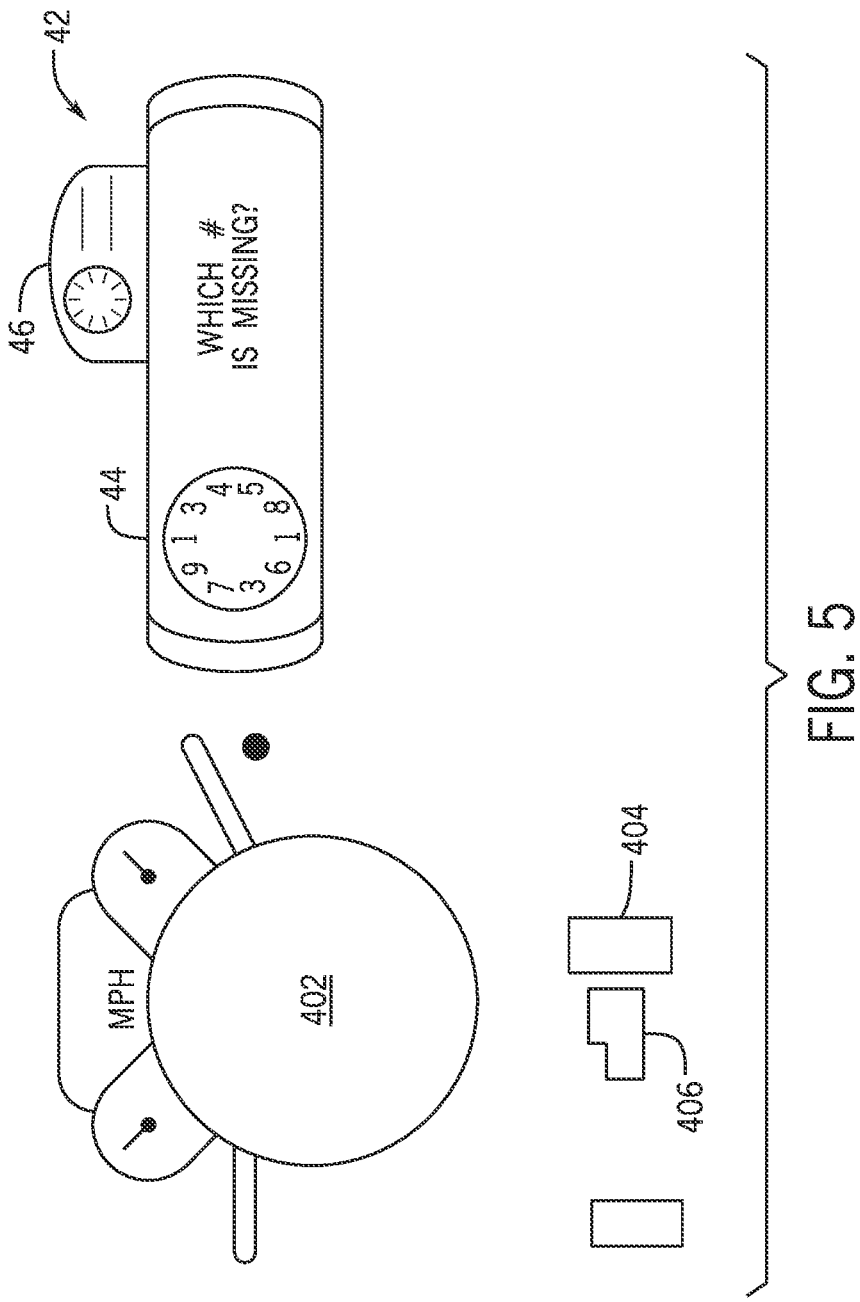
FIG. 5 is a schematic diagram of a dashboard of a vehicle incorporating a communication management system, in accordance with an embodiment of the present disclosure.

As previously described, FIG. 5 illustrates an embodiment of a test implementer that is part of the vehicle 42. Specifically, the vehicle 42 comprises the steering wheel 402, the accelerator pedal 404, and the brake pedal 406. The infotainment system 44 may be disposed adjacent to the steering wheel 402. The cognition test may be presented on the user interface 18c of the infotainment system 44. Rather than receiving inputs on the user interface 18c, inputs for the cognition test may come from the steering wheel 402, the accelerator pedal 404, the brake pedal 406, other local inputs or any combination thereof, as disclosed above. The illustrated embodiment also includes the remote device 46 (e.g., a smart phone tethered to the vehicle 42). The communication management system 10 (which may be resident on the vehicle 42 or the remote device 46) may present the cognition test via a display including the user interface 18d of the remote device 46. The remote device 46 may be connected to the vehicle 42 via hardwired connection or a remote connection (e.g., Bluetooth). The inputs for the cognition test, even when performed via the remote device 46, may come from the steering wheel 402, the accelerator pedal 404, the brake pedal 406, other vehicle inputs (e.g., a radio knob, blinker light activator), inputs on the remote device 46, or any combination thereof, as disclosed above.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A communication management system configured to provide a cognition test, the communication management system comprising:
    a test implementer comprising:
        a biometric detector configured to receive a biometric input; and
        a graphical user interface; and
    one or more processors configured to administer the cognition test by:
        receiving the biometric input;
        determining that the biometric input corresponds to an authorized user;
        displaying, based on the determining, a plurality of image components on the graphical user interface such that each image component of the plurality of image components is caused to move relative to one another along a respective movement path within the graphical user interface and wherein a first speed of a first image component of the plurality is different than a second speed of a second image component of the plurality while moving along respective movement paths;
        receiving an input via the graphical user interface, wherein the input comprises user selection of a moving image component during movement;
        comparing the input to a solution value for the cognition test, wherein the solution value is based on the selected moving image component of the plurality of image components corresponding to the solution value;
        blocking access to a protected account based on the input not correlating to the solution value; and
        allowing access to the protected account based on the input correlating to the solution value.

2. The communication management system of claim 1, wherein the test implementer comprises a smart phone, a laptop computer, a desktop computer, an infotainment system, or a combination thereof.

3. The communication management system of claim 1, wherein the one or more processors are configured to administer the cognition test by displaying the plurality of imaging components as transitioning along the respective movement paths from an outer perimeter toward a central area of the graphical user interface.

4. The communication management system of claim 1, wherein a distance between the first image component and the second image component changes while moving along the respective movement paths.

5. The communication management system of claim 1, wherein the test implementer communicates or is incorporated with a vehicle, and wherein a steering wheel, brake pedal, or accelerator pedal of the vehicle is configured to provide the input.

6. The communication management system of claim 1, wherein the test implementer comprises a camera or a fingerprint detector.

7. The communication management system of claim 6, wherein the one or more processors is configured to require detection of an authorized facial recognition image via the camera or an authorized fingerprint via the fingerprint detector in conjunction with the input correlating to the solution value before allowing access to the protected account.

8. The communication management system of claim 7, wherein the one or more processors is configured to require the detection of the authorized facial recognition image or the authorized fingerprint within a common timeframe of the input correlating to the solution value before allowing access to the protected account.

9. The communication management system of claim 1, wherein the one or more processors is configured to require completion of the cognition test within a timeframe.

10. The communication management system of claim 9, wherein the one or more processors is configured to calibrate the timeframe based on calibration testing via the test implementer.

11. The communication management system of claim 1, wherein the one or more processors is configured to facilitate selection of a type of the plurality of image components to be utilized in the cognition test by a user from a variety of types of image components.

12. The communication management system of claim 1, wherein the plurality of image components comprises a plurality of numerical values in an incomplete series of numerical values with at least one numerical value missing, and the cognition test requires identification of the at least one numerical value missing with the input.

13. The communication management system of claim 12, wherein the graphical user interface displays multiple numerical values, including an option equal to the at least one numerical value missing, as options for selection as the input.

14. The communication management system of claim 1, wherein the test implementer comprises a camera configured to capture images of a user's face and utilize the images in the graphical user interface to facilitate providing the input.

15. The communication management system of claim 1, wherein the one or more processors are configured to administer the cognition test by displaying an individual image component of the plurality of image components as moving with a varying speed while along the respective movement path.

16. A method of providing a cognition test electronically to protect data, the method comprising:
  displaying a plurality of image components on a graphical user interface of a test implementer such that the displaying causes each image component of the plurality of image components to move relative to one another along a respective movement path within the graphical user interface and wherein a first speed of a first image component of the plurality is different than a second speed of a second image component of the plurality while moving along respective movement paths;
  receiving a first input via the graphical user interface;
  comparing the first input to a solution value for the cognition test;
  blocking access to a protected account based on the first input not correlating to the solution value; and
  allowing access to the protected account after blocking the access based on a second input correlating to the solution value.

17. The method of claim 16, comprising providing the graphical user interface on a display of a smartphone and receiving the first input and the second input via the display of the smartphone, wherein the input and the second input are provided based on a correlation between an image captured via a camera of the smartphone and the plurality of image components.

18. The method of claim 16, comprising requiring receipt of a valid facial identification or valid fingerprint via a detector of the test implementer to initiate displaying of the plurality of image components.

19. The method of claim 16, wherein the image components are numerical values, graphical images, textual values, or a combination thereof.

20. The method of claim 16, comprising providing a timeframe in which the input must be received after initiating the displaying of the plurality of image components to allow passing of the cognition test.

21. A communication management system configured to provide a cognition test, the communication management system comprising:
  a test implementer comprising a graphical user interface and a biometric detector; and
  one or more processors configured to administer the cognition test by:
    displaying a plurality of image components on the graphical user interface such that each image component of the plurality of image components is displayed to move relative to one another along a respective movement path within the graphical user interface and wherein a first speed of a first image component of the plurality is different than a second speed of a second image component of the plurality while moving along respective movement paths;
    receiving an input via the graphical user interface;
    comparing the input to a solution value for the cognition test;
    blocking access to a protected account based on the input not correlating to the solution value;
    blocking access to the protected account based on the input being received without being in conjunction with identification of an authorized biometric input by the biometric detector; and
    allowing access to the protected account based on the input correlating to the solution value.

* * * * *